United States Patent [19]

Makita

[11] Patent Number: 4,502,579

[45] Date of Patent: Mar. 5, 1985

[54] SYSTEM FOR PREVENTING THE OVERHEAT OF A CLUTCH FOR AN INTERNAL COMBUSTION ENGINE

[75] Inventor: Fujio Makita, Hachioji, Japan

[73] Assignee: Fuji Jukogyo Kabushiki Kaisha, Tokyo, Japan

[21] Appl. No.: 350,518

[22] Filed: Feb. 19, 1982

[30] Foreign Application Priority Data

Feb. 19, 1981 [JP] Japan ................................ 56-24081

[51] Int. Cl.$^3$ ............................................ B60K 41/28
[52] U.S. Cl. .............................. 192/0.052; 192/0.076; 192/0.092; 192/82 T
[58] Field of Search ...................... 192/0.033, 54, 0.07, 192/56 R, 0.075, 0.076, 0.092, 82 T, 0.048, 106 F, 3.58, 0.096, 30 W, 3.56; 74/866; 361/238, 239, 241, 242, 243

[56] References Cited

U.S. PATENT DOCUMENTS

| | | | |
|---|---|---|---|
| 3,402,793 | 9/1968 | Scholl | 192/3.56 |
| 3,834,499 | 9/1974 | Candellero et al. | 192/0.033 |
| 4,068,543 | 1/1978 | Sakai et al. | 74/866 |
| 4,282,947 | 7/1981 | Kemper | 192/0.033 |
| 4,351,205 | 9/1982 | Fischer | 74/866 |

Primary Examiner—George H. Krizmanich
Assistant Examiner—M. Manley
Attorney, Agent, or Firm—Martin A. Farber

[57] ABSTRACT

A system for preventing the overheating of an electromagnetic clutch of an internal combustion engine mounted on a vehicle caused by slipping of the clutch for a considerably long time. The electromagnetic clutch has a drive member secured to a crankshaft of the internal combustion engine, a driven member adjacent to the drive member, and a magnetizing coil provided in one of said members. The heat quantity generated in the clutch is calculated by an operation circuit. A clutch current control circuit is provided such that when the heat quantity exceeds a predetermined value, the electromagnetic clutch is applied with a rated clutch current to engage the clutch without slipping for preventing overheating by the slipping.

10 Claims, 4 Drawing Figures

4,502,579

SYSTEM FOR PREVENTING THE OVERHEAT OF A CLUTCH FOR AN INTERNAL COMBUSTION ENGINE

BACKGROUND OF THE INVENTION

The prevent invention relates to a system for preventing overheating of a clutch for an internal combustion engine.

A clutch such as friction clutches and electromagnetic clutches slips between slipping surfaces of the clutch, when the speed of the crankshaft of the engine is different from the speed of a driven shaft. The slip generates heat which elevates the temperature of the clutch. In the normal clutch operation, the amount of heat is negligible, but if the slipping continues for a considerable time, the clutch elements will be destroyed.

Describing overheating of the clutch, for example, with respect to the electromagnetic clutch for a vehicle, the electromagnetic clutch is so arranged that the clutch torque is controlled in dependency on the engine speed for achieving a smooth starting of the vehicle, even when starting on a steep hill in the upward direction, while allowing slipping in the clutch at an engine speed providing a clutch torque suitable for starting. However, if such a slipping condition continues for a long time, the clutch will overheat causing an impaired clutch operation.

SUMMARY OF THE INVENTION

The object of the present invention provides a system which may prevent overheating of a clutch by detecting the heat quantity generated in the clutch and controlling the clutch engagement characteristics in dependency on the detected heat quantity.

According to the present invention, there is provided a system for preventing overheating of a clutch for an internal combustion engine mounted on a vehicle, which clutch has a drive member secured to a crankshaft of the internal combustion engine and a driven member adjacent to the drive member, the vehicle having a transmission secured to the driven member and having multi-stage change gears, the system comprising a first circuit means for producing an output signal in proportion to the number of revolutions of the drive member; a second circuit means for producing an output signal in proportion to the number of revolutions of the driven member; calculating circuit means including a multiplier adapted to multiply the difference between the two output signals of the first and second circuit means by the output signal of the first circuit means, an integrator for integrating the output of the multiplier, and a comparator for producing a signal when the output of the integrator exceeds a predetermined value; and means for engaging the clutch in dependency on the signal of the comparator.

With the above and other objects and advantages in view, the present invention will become more clearly understood in connection with the detailed description of a preferred embodiment, when considered with the accompanying drawings, of which:

DETAILED DESCRIPTION OF THE PREFERRED EMBODIMENT

Figure 1:
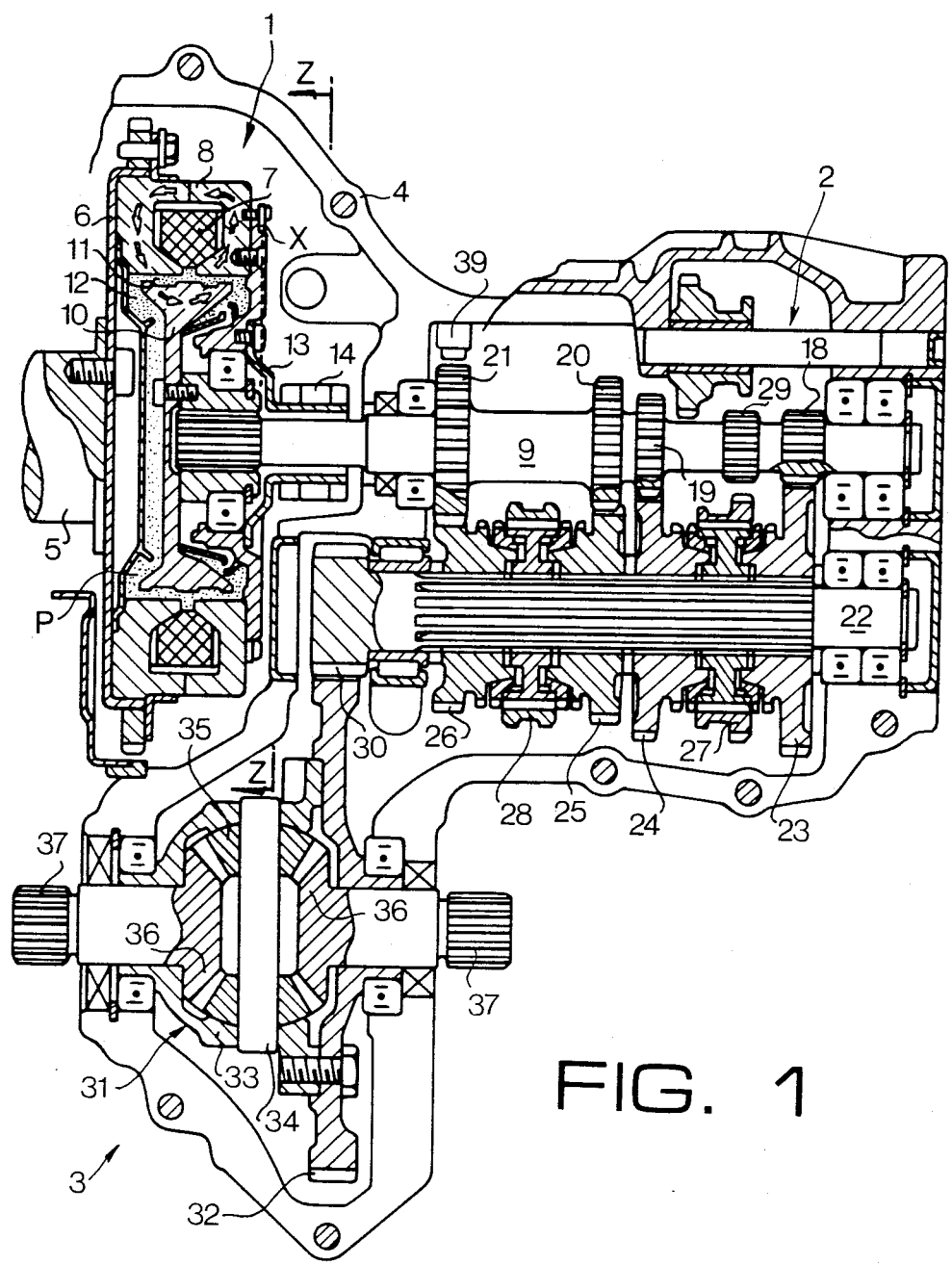
FIG. 1 is a sectional view of an electromagnetic clutch used in a system according to the present invention.
Figure 2:
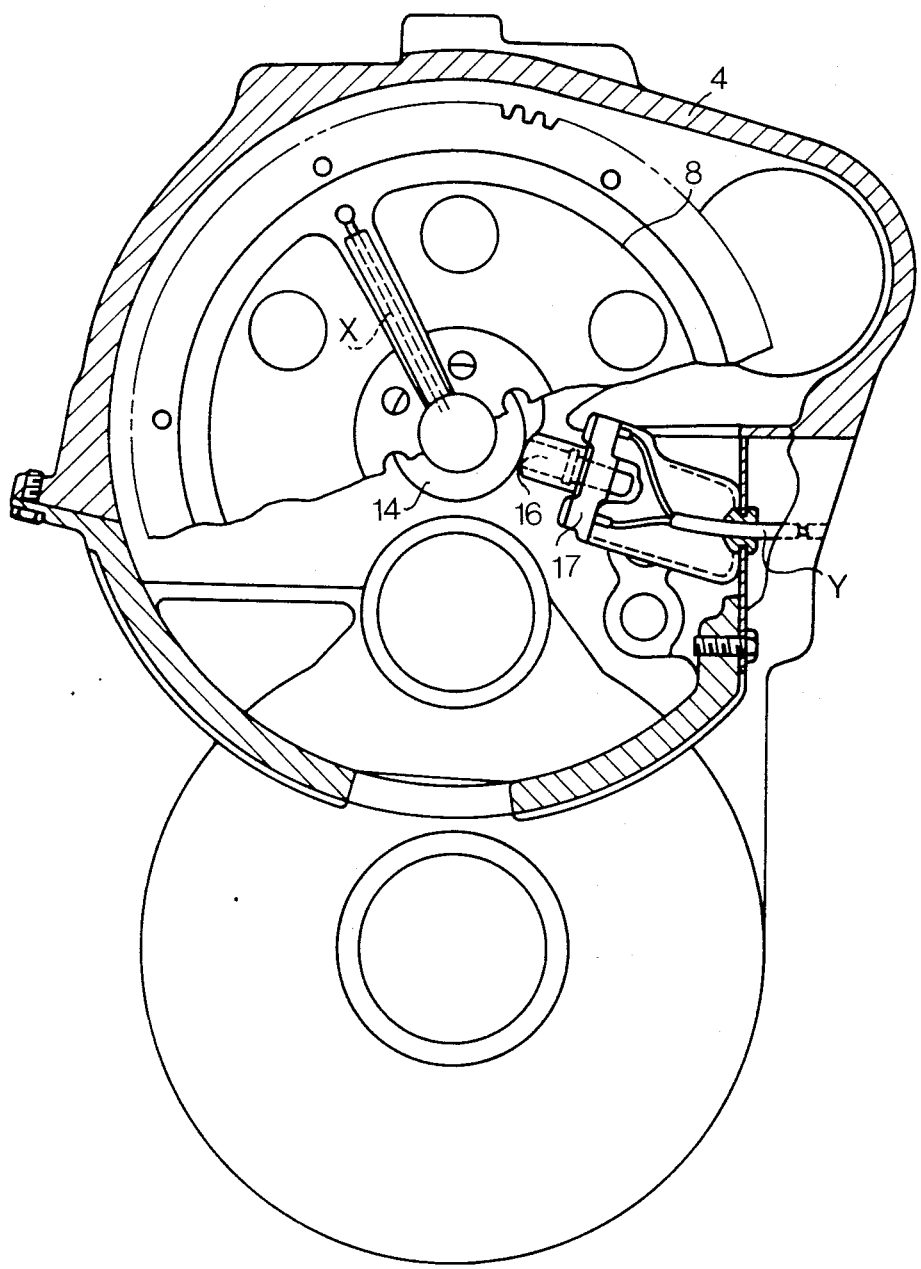
FIG. 2 is a sectional view taken along the line Z—Z in FIG. 1.

Referring to FIGS. 1 and 2 showing an electromagnetic powder clutch to which the present invention is applied, an electromagnetic powder clutch 1 is operatively connected between an internal combustion engine (not shown) and a four-speed transmission 2 which is connected to a final reduction device 3.

The electromagnetic powder clutch 1 is provided in a clutch case 4. The electromagnetic powder clutch comprises a drive plate 6 connected to the end of a crankshaft 5 of the internal combustion engine, an annular drive member 8 secured to the drive plate 6, a magnetizing coil 7 provided in the drive member 8, and a driven member 10 secured by a spline engagement to an input shaft 9 of the transmission 2, spaced leaving an annular gap 11 from the drive member 8. Magnetic powder P is provided in a powder chamber 12 and the gap 11 is adapted to be filled with the powder. A cap 13 is secured to the drive member 8. The cap 13 has a cylindrical portion coaxial with the input shaft 9, to which slip rings 14 are secured. The slip rings 14 are connected to the coil 7 by leads X. Brushes 16 (FIG. 2) press against the slip rings 14 and are supported in a holder 17 and connected to a hereinafter described control means by leads Y.

In such a construction, the drive plate 6 and the drive member 8 rotate together with the crankshaft 5 and the magnetic powder which has been sealed in the powder chamber 12 is drawn to the inner surface of the drive member 8 by centrifugal force. When the magnetizing coil 7 is excited by the current supplied through the leads Y, the brushes 16, the slip rings 14 and the leads X, the drive member 8 is magnetized to produce a magnetic flux passing through the driven member 10 as shown by arrows in FIG. 1. Thus, the powder aggregates in the gap 11, so that the output power of the crankshaft 5 is transmitted to the input shaft 9 through the clutch.

In the transmission 2, 1st to 4th speed drive gears 18 to 21 are integrally mounted on the input shaft 9. The drive gears 18 to 21 are respectively engaged with driven gears 23 to 26. Driven gears 23 to 26 are rotatably mounted on the output shaft 22 parallel to the input shaft 9. Each of the driven gears 23 and 24 is adapted to be engaged with the output shaft 22 by operating a synchromesh mechanism 27 and each of the driven gears 25 and 26 is adapted to be engaged with the output shaft 22 by a synchromesh mechanism 28 in a well-known manner. Further, a reverse drive gear 29 is mounted on the input shaft 9. Thus, by operating a shift levers (FIG. 4) of the transmission, the driven gear 23 is coupled integrally with the output shaft 22 by the synchromesh mechanism 27 and the 1st speed is obtained on the output shaft 22. Similarly, the 2nd, 3rd and 4th speeds may be respectively obtained by operating the shift lever.

Moreover, provided on an end of the output shaft 22 is an output gear 30 which engages with a ring gear 32 in a differential 31 of the final reduction device 3. Thus, the output of the output shaft 22 of the transmission 2 is transmitted to side gears 36 through a case 33, a spider 34 and pinions 35, and further to driving wheels through wheel shafts 37. In accordance with the present invention, a magnetically operated speed sensor 39 (FIGS. 1 and 3) is secured on the inner wall of the clutch case 4 at a position adjacent to the drive gear 21. The speed sensor 39 is such that when the magnetic field is changed by a passing tooth of the gear 21, an output pulse is produced.

Figure 3:
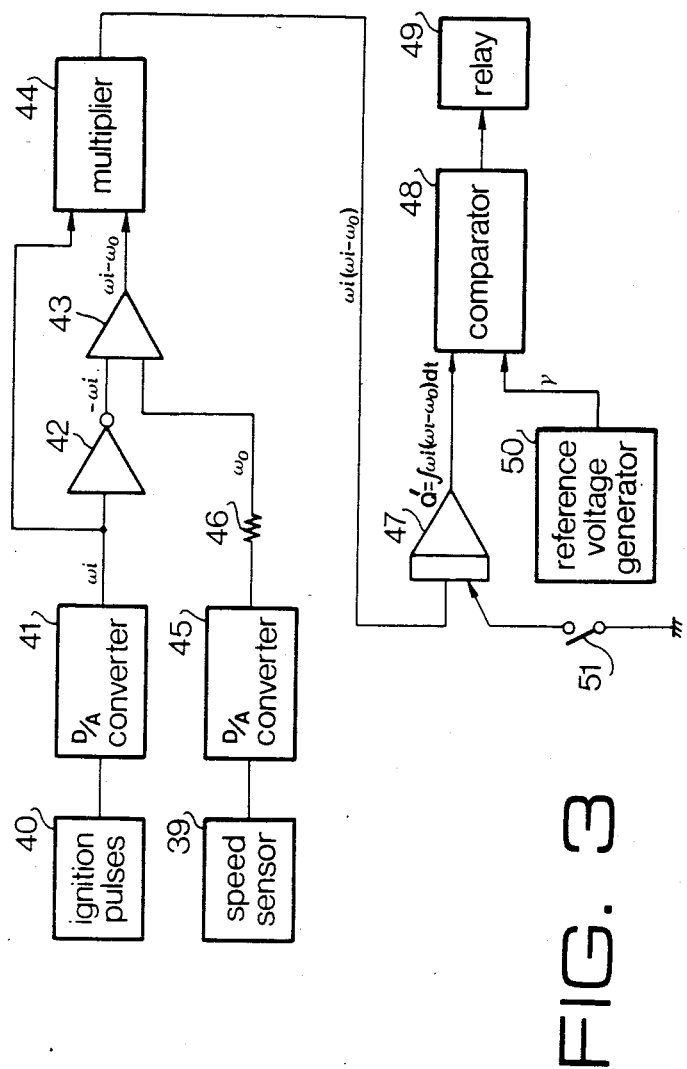
FIG. 3 is a block diagram showing a circuit for detecting the heat quantity generated in the clutch.

Referring to FIG. 3 showing a system for detecting the heat quantity generated in the clutch, ignition pulses 40 for the engine are applied to a D/A (digital-analog) converter 41. The output of the D/A converter 41 is connected to an inverter 42 and to one of the inputs of a multiplier 44. The output of the inverter 42 is connected to one of the inputs of an adder 43. The output of the magnetically operated speed sensor 39 is connected to a D/A converter 45, the output of which in turn is connected to the other input of the adder 43 via a resistor 46. The output of the adder 43 is connected to the other input of the multiplier 44. The output of the multiplier 44 is connected to an input of an integrator 47. The output of the integrator 47 is connected to one input of a comparator 48. The comparator 48 is applied with a reference voltage from a reference voltage generator 50 at its other input. The output of the comparator 48 is connected to a coil of a relay 49 (also see FIG. 4) provided for controlling the engagement characteristic of the clutch 1. An acceleration switch 51 is operatively engaged with an accelerator pedal (not shown) of the vehicle and adapted to be closed (on condition) when the accelerator pedal is depressed. The acceleration switch 51 is connected to a starting input of the integrator 47.

Figure 4:
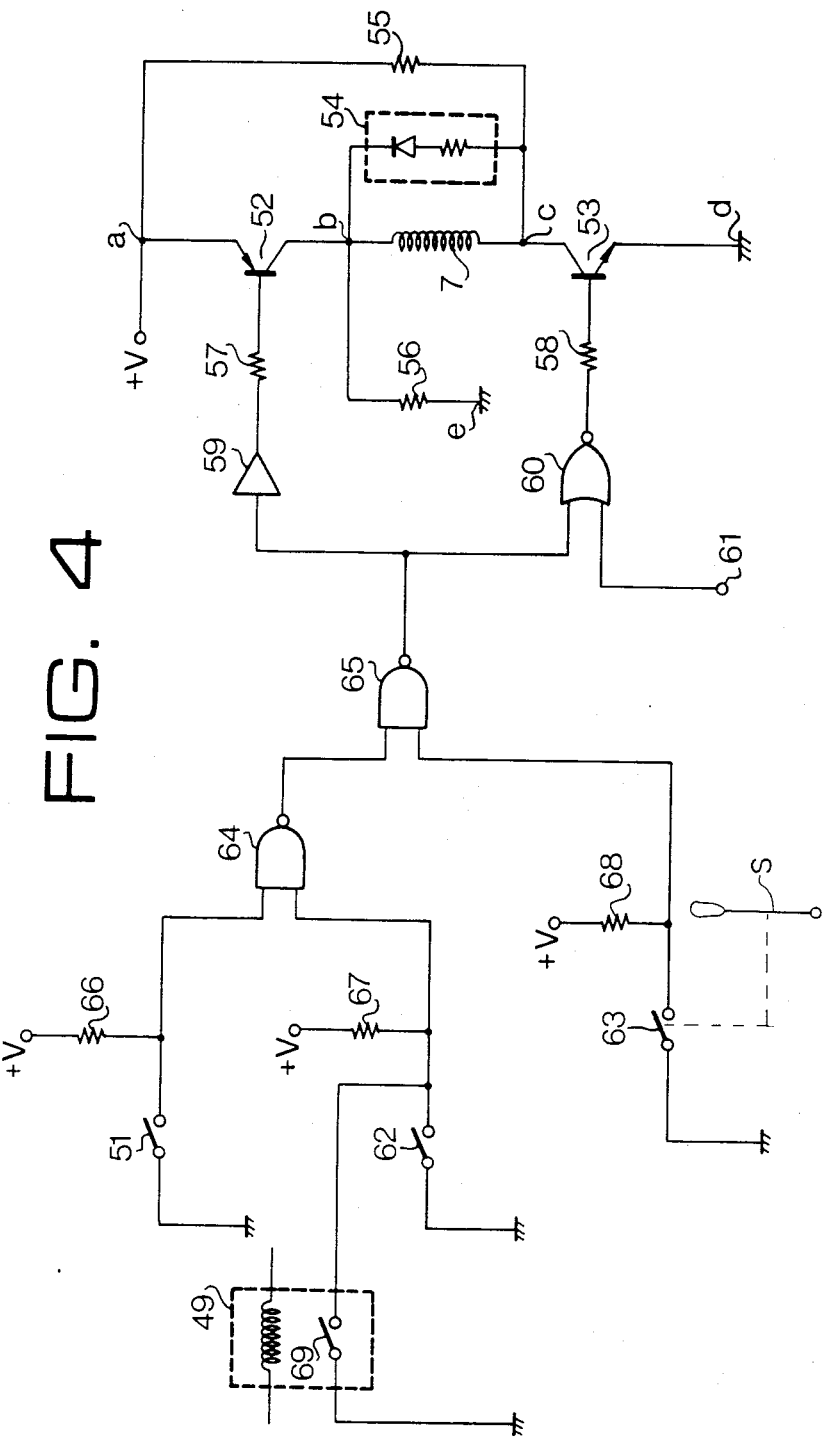
FIG. 4 is a circuit showing an example of the system of the present invention.

Referring to FIG. 4, a transistor 52 of the PNP type and a transistor 53 of the NPN type are connected in series to opposite ends of the magnetizing coil 7. An emitter of the transistor 52 is connected to an electric source, while an emitter of the transistor 53 is grounded. A commutation circuit 54 which comprises a diode and a resistor is connected to both ends b, c of the coil 7. A resistor 55 for inverted current is connected to the electric source and the collector of the transistor 53, and a resistor 56 for inverted current is connected between the collector of the transistor 52 and the ground. The bases of the transistors 52, 53 are connected to resistors 57, 58, respectively. The resistor 57 is connected to an output of a NAND gate 65 via a buffer 59 and the resistor 58 is connected to an output of a NOR gate 60. One of inputs of the NOR gate 60 is connected to the output of the NAND gate 65. On the other hand, a clutch control signal is applied to the other input 61 of the NOR gate 60. The input 61 is at a low level during operation of the shift levers.

Further, the circuit of FIG. 4 includes a vehicle speed switch 62 which is on (closes) when the vehicle speed is higher than a predetermined speed $V_1$, and a shift lever switch 63 which is provided on the shift lever, and is on (closes) during operation of the shift lever. One end of each of the switches 51, 62 and 63 is grounded. The other end of the acceleration switch 51 is connected to positive voltage source via a resistor 66 and to one of the inputs of a NAND gate 64. The other end of the vehicle switch 62 is connected to the positive voltage source via a resistor 67 and to the other input of the NAND gate 64. The output of the NAND gate 64 is connected to one of inputs of the NAND gate 65. The other end of the shift lever switch 63 is connected to the positive voltage source via a resistor 68 and to the other input of the NAND gate 65. A direct connection switch 69 is connected to the vehicle speed switch 62 in parallel. The switch 69 is adapted to be operated by the relay 49.

The operation of the embodiment of the present invention will be explained as follows.

When the number of revolutions of the crankshaft 5 is different from that of the input shaft 9, the clutch slips resulting in the generation of heat. The heat quantity Q during the slipping may be represented as:

$$Q = \int_0^{t_1} (\omega_i - \omega_0) Tc \, dt \tag{1}$$

where
$t_1$ is the period of time of the slipping,
$\omega i$ is the angular velocity of the crankshaft 5,
$\omega_0$ is the angular velocity of the input shaft 9,
Tc is the clutch torque.
The clutch torque characteristic can be presented as $$Tc = f(\omega i) \tag{2}$$

Thus, the equation (1) becomes as follows:

$$Q = \int_0^{t_1} (\omega_i - \omega_0) \cdot f(\omega_i) dt \tag{3}$$

If the equation (2) is approximately presented as:

$$Tc = a \cdot \omega i,$$

where $a$ is a constant, the equation (3) becomes $$Q = a \int_0^{t_1} \omega_i(\omega_i - \omega_0) dt \tag{4}$$

$$Q' = \frac{Q}{a} = \int_0^{t_1} \omega_i (\omega_i - \omega_0) dt \tag{5}$$

Thus, the heat quantity generated in the clutch can be detected by electrically calculating the equation (5) by substituting for $\omega i$ and $\omega_0$ the detected angular velocities of the crankshaft 5 and input shaft 9.

The circuit of FIG. 3 operates to calculate the equation (5) as follows. The ignition pulses 40 have repetition frequency which is in proportion to the engine speed, namely, the speed of the crankshaft 5. The D/A converter 41 converts the ignition pulses to direct current voltage as an angular velocity signal $\omega i$. On the other hand, the speed sensor 39 produces pulses having a repetition frequency in proportion to the speed of the input shaft 9 of the transmission 2. The pulses are converted by the D/A converter 45 to direct current which is passed through the resistor 46 to produce an angular velocity signal $\omega 0$. The circuit is such that the signals $\omega i$ and $\omega 0$ are equal in voltage when the speeds of the crankshaft 5 and input shaft 9 are equal. The signal $\omega i$ is inverted to the signal $-\omega i$ by the inverter 42. Both signals $-\omega i$ and $\omega 0$ are added by the adder 43 to produce the signal $(\omega i - \omega 0)$. The multiplier 44 operates to multiply $(\omega i - \omega 0)$ by the signal $\omega i$ from the D/A converter 41 to produce $\omega i(\omega i - \omega 0)$. The output $\omega i(-\omega i - \omega 0)$ is applied to the integrator 47 and integrated when the acceleration switch 51 is closed by depression of the accelerator pedal. Thus, the integrator 47 produces an output signal $$\int_0^{t_1} \omega_i(\omega_i - \omega_0)dt = Q'$$

The signal Q' is in proportion to the heat quantity generated by slipping in the clutch. The signal Q' is sent to the comparator 48 for comparison with a reference voltage $\gamma$ from the reference voltage generator 50. When the heat quantity is small, that is $Q' < \gamma$, the comparator does not produce an output. When the heat quantity reaches or exceeds a predetermined value, that is $Q' \geq \gamma$, the comparator 48 produces an output which excites the coil of the relay 49. In response, the direct connecting switch 69 is closed so as to change the clutch characteristic for connecting the clutch 1 without slipping as described hereinafter.

Referring to FIG. 4, when the vehicle speed is higher than the set predetermined speed $V_1$ and the accelerator pedal is depressed and the shift levers is not operated, the accelerator switch 51 and vehicle speed switch 62 are on and the shift lever switch 63 is off. The NAND gate 64 produces a high level output. Therefore, both inputs of the NAND gate 65 are at high levels, so that the NAND gate 65 produces a low level signal. The low level signal turns on the transistors 52 and 53 to pass a rated clutch current in the order of a→b→c→d to energize the coil 7. The clutch current flowing through the coil 7 is controlled by a clutch control signal applied to the input 61 of the NOR gate 60.

When the acceleration switch 51 or speed switch 62 is off or the shift lever switch 63 is on, the NAND gate 65 is applied with a low level signal and a high level output appears at the output (except when the shift lever switch 63 and the speed switch 62 are off and the acceleration switch 51 is on). Therefore, transistors 52 and 53 are turned off, so that electric current flows in the order of a→c→b→e. Thus, the inverted current passes through the coil 7 resulting in the disengagement of the clutch.

When the clutch is overheated by slipping for a considerable time, the switch 69 closes, whereby a low level signal is applied to the NAND gate 64 even when the car speed switch 62 is open. Thus, the NAND gate 64 produces a high level output. Therefore, the NAND gate 65 produces a low level output when the shift lever S is not moved, so that the transistors 52 and 53 are turned on. Thus, the rated clutch current flows in the order of a-b-c-d to fully connect the clutch 1 thereby stopping slipping of the clutch. As a result, the engine stalls by a heavy load upon starting in an upward direction at a steep hill thereby preventing overheating of the clutch. If the shift lever S is moving in the above-condition, then inverted current flows through the clutch coil 7 via a to c to b to e causing disengagement of the clutch.

From the foregoing it will be understood that the present invention provides a system which detects the heat quantity generated in the clutch by slipping between its engaging members and controls the clutch engagement characteristic in dependency on the detected heat quantity for preventing overheating of the clutch.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for preventing overheating of a clutch for an internal combustion engine mounted on a vehicle, the clutch having a drive member secured with a crankshaft of said internal combustion engine and a driven member adjacent to said drive member, heating occurring during slipping of said driven member relative to said drive member, and the vehicle having a transmission secured with said driven member and comprising multi-stage change gears, comprising:

said circuit means for producing a first output signal in proportion to the speed of revolution of said drive member;

second circuit means for producing a second output signal in proportion to the speed of revolution of said driven member;

calculating circuit means including an adder means for subtracting said second output signal from said first output signal and a multiplier means for multiplying a difference of the subtraction by said first output signal;

integrator means for integrating an output of said multiplier;

comparator means for producing a signal when an output of said integrator means exceeds a predetermined value; and clutch control means for engaging said clutch in dependency on said signal of said comparator means, so as to prevent overheating of said clutch caused by said slipping.

2. The system for preventing overheating of the clutch for the internal combustion engine mounted on a vehicle in accordance with claim 1 further comprises a clutch current control circuit means for controlling said clutch control means.

3. The system for preventing overheating of the clutch for the internal combustion engine mounted on a vehicle in accordance with claim 2 wherein said clutch current control circuit means is so arranged to pass a rated clutch current in dependency on said signal of said comparator means.

4. A system for preventing overheating of a clutch for an internal combustion engine mounted on a vehicle, the clutch having a drive member secured with a crankshaft of said internal combustion engine and a driven member adjacent to said drive member, heating occurring during slipping of said driven member relative to said drive member, and the vehicle having a transmission secured with said driven member and comprising multi-stage change gears, comprising:

first circuit means for producing a first output signal in proportion to the speed of revolution of said drive member;

second circuit means for producing a second output signal in proportion to the speed of revolution of said driven member;

calculating circuit means including means including an adder means for subtracting said second output signal from said first output signal and a multiplier means for multiplying a difference of the subtraction by said first output signal;

integrator means for integrating an output of said multiplier;

comparator means for producing a comparator output signal when an output of said integrator means exceeds a predetermined value;

clutch control means for engaging said clutch in dependency on said comparator output signal of said comparator means, so as to prevent overheating of said clutch caused by said slipping; and said calculating circuit means comprises, a first D/A converter and a second D/A converter connected with said first circuit means and said second circuit means, respectively, inverter means for inverting an output signal of said first D/A converter, said adder means for adding output signals of said inverter means and said second D/A converter, and said multiplier means for multiplying output signals of said first D/A converter and said adder means.

5. The system according to claim 1, wherein said clutch control means for fully engaging said clutch in dependency on said comparator output signal of said comparator means, so as to prevent overheating of said clutch caused by said slipping.

6. The system according to claim 1, wherein said engine stops by a heavy load upon starting the vehicle in a forward upward direction on a steep incline when said comparator output signal from said comparator means, via said clutch control means, engages said clutch.

7. The system according to claim 1, wherein said clutch is a powder clutch.

8. The system according to claim 4, wherein said clutch is a powder clutch.

9. The system according to claim 1, wherein said clutch control means comprises a switch means for turning on said integrator means when an accelerator pedal of the vehicle is depressed, and a vehicle speed switch means for engaging said clutch when the vehicle speed is greater than a predetermined speed such that the system for preventing overheating of the clutch is effective at vehicle speeds less than said predetermined speed.

10. A system for preventing overheating of a clutch for an internal combustion engine mounted on a vehicle, the clutch having a drive member secured with a crankshaft of said internal combustion engine and a driven member adjacent to said drive member, heating occurring during slipping of said driven member relative to said drive member, and the vehicle having a transmission secured with said driven member and comprising multi-stage change gears, comprising:

first circuit means for producing a first output signal in proportion to the speed of revolution of said drive member;

second circuit means for producing a second output signal in proportion to the speed of revolution of said driven member;

calculating circuit means including means for subtracting said second output signal from said first output signal and a multiplier means for multiplying a difference of the subtraction by a signal dependent on the clutch torque;

integrator means for integrating an output of said multiplier;

comparator means for producing a signal when an output of said integrator means exceeds a predetermined value; and clutch control means for engaging said clutch in dependency on said signal of said comparator means, so as to prevent overheating of said clutch caused by said slipping.

* * * * *